US 6,656,301 B2

(12) United States Patent
Kirby

(10) Patent No.: US 6,656,301 B2
(45) Date of Patent: Dec. 2, 2003

(54) GREEN TIRE STORAGE DEVICE WITH INFLATABLE BLADDERS

(75) Inventor: James M. Kirby, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 168 days.

(21) Appl. No.: 09/758,740

(22) Filed: Jan. 11, 2001

(65) Prior Publication Data

US 2002/0088530 A1 Jul. 11, 2002

(51) Int. Cl.$^7$ .......................... B29D 30/06; B60B 30/04
(52) U.S. Cl. ................ 156/110.1; 156/111; 156/394.1; 156/396; 211/23
(58) Field of Search ............................. 156/111, 110.1, 156/406.2, 396, 416, 394.1, 421.6, 421.8; 211/23, 24; 269/48.1; 425/38, 52, 53

(56) References Cited

U.S. PATENT DOCUMENTS

| | | | | |
|---|---|---|---|---|
| 2,028,078 A | * | 1/1936 | State et al. ................. | 156/396 |
| 2,306,540 A | * | 12/1942 | Bales ......................... | 211/23 |
| 3,147,864 A | | 9/1964 | Sylvester et al. .......... | 211/24 |
| 3,393,807 A | | 7/1968 | Sylvester et al. .......... | 211/24 |
| 3,700,113 A | | 10/1972 | Hager ........................ | 211/23 |
| 3,759,394 A | | 9/1973 | Hottle et al. ............... | 211/23 |
| 3,824,048 A | | 7/1974 | Getz ....................... | 425/28 R |
| 3,909,337 A | * | 9/1975 | Yabe ........................ | 156/416 |
| 3,935,948 A | | 2/1976 | Podojil ...................... | 211/23 |
| 4,039,365 A | | 8/1977 | Takasuga et al. .......... | 156/405 |
| 4,148,681 A | | 4/1979 | Collins et al. ........... | 156/405 R |
| 4,197,065 A | | 4/1980 | Rosa et al. ............... | 425/34 A |
| 4,269,644 A | | 5/1981 | Goldstein et al. .......... | 156/96 |
| 4,447,385 A | | 5/1984 | Blosser et al. ............ | 264/315 |
| 5,190,605 A | * | 3/1993 | Holroyd et al. ............ | 156/416 |

FOREIGN PATENT DOCUMENTS

| | | | |
|---|---|---|---|
| CZ | 110510 | 4/1964 | .................. 81/119 |
| DE | 1 208 878 | 1/1966 | |
| DE | 273 602 A1 | 11/1989 | |
| EP | 1 090 729 A2 | 4/2001 | |
| JP | 55-100148 A | * 7/1980 | |

OTHER PUBLICATIONS

International Search Report (PCT/ISA/210).
Translations of non–English references from International Search Report cited in an Information Disclosure Statement submitted on Jul. 22, 2002.

* cited by examiner

Primary Examiner—Geoffrey L. Knable
(74) Attorney, Agent, or Firm—Cynthia S. Murphy; Michael R. Huber

(57) ABSTRACT

A green tire holding device (10) including a frame (12), a rod (14) extending horizontally from the frame (12), and a bladder (16) mounted on the rod (14). The bladder (16) is inflatable to an inflated shape so that it contacts a substantial portion of an inner circumference of a green tire (T) to support the green tire during a pre-curing wait cycle. The green tire holding device (10) can comprise a plurality of rods (14), a plurality of bladders (16), and/or a plurality of bladders (16) on each rod (14). The bladders (16) can be inflated at substantially the same time and/or certain bladders (16) can be deflated independently of other bladders (16). In a tire manufacturing method, the loaded green tire storage device (10) is transported to a doping/curing area with the bladders (16) deflated. At the doping/curing area, the tires (T) are removed from the rods (14), doped, and re-hung on the rods (14). The bladders (16) are then inflated so that the tires (T) are stored on inflated bladders during the pre-curing wait cycle.

16 Claims, 3 Drawing Sheets

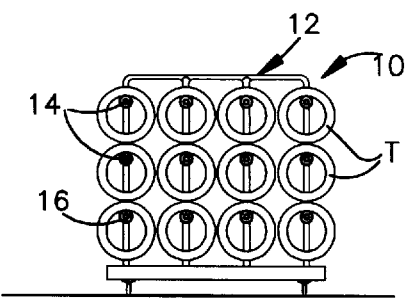
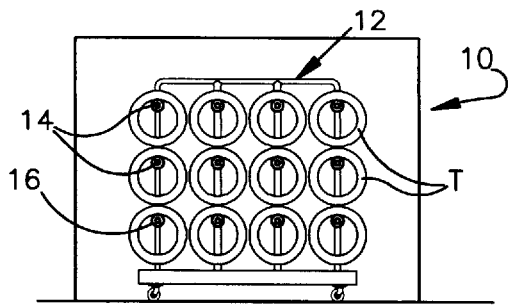
Figure 5A                   Figure 5B
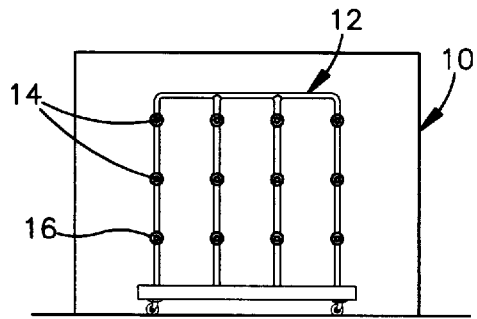
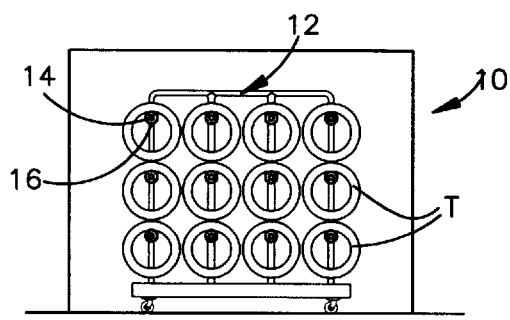
Figure 5C                   Figure 5D
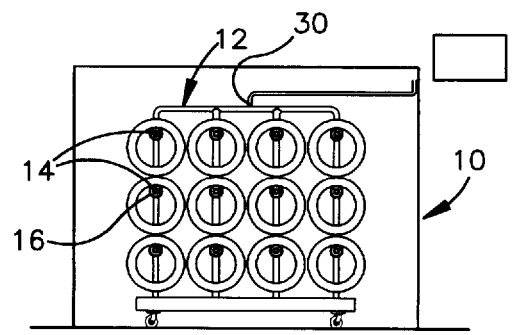
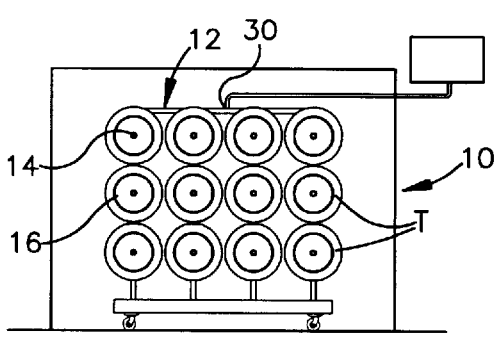
Figure 5E                   Figure 5F
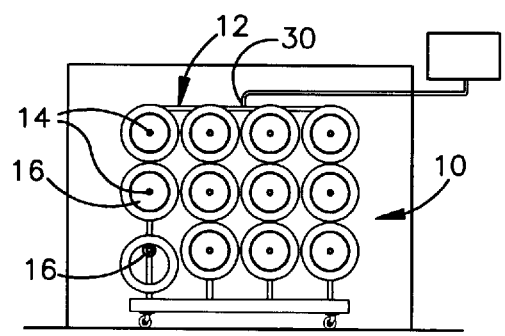
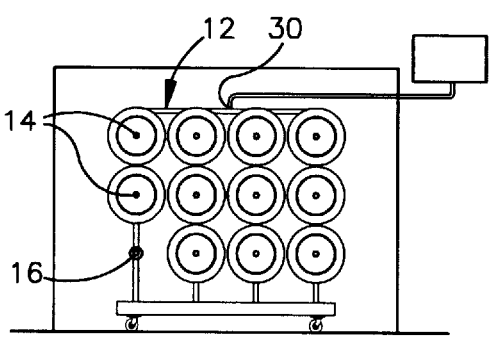
Figure 5G                   Figure 5H

GREEN TIRE STORAGE DEVICE WITH INFLATABLE BLADDERS

FIELD OF THE INVENTION

This invention relates generally to a device for storing green tires during a pre-curing wait cycle.

BACKGROUND OF THE INVENTION

In the manufacture of a tire, its various components, including reinforcing components embedded in a matrix of unvulcanized rubber or other unvulcanized rubberlike material, are assembled on a building form. The tire at this stage of the manufacturing process is commonly called a green tire. After being built, a green tire is transported to a doping/curing area whereat it is doped. Thereafter, the green tire is subjected to a shaping and vulcanizing press and shaped into its final form. There is almost always a waiting period between the doping of the green tire and its subsequent curing. This time period can be referred to as the pre-curing wait cycle and can extend anywhere from a few hours to several days.

During the pre-curing wait cycle, a green tire is usually stored on a holding device. Of particular relevance to the present invention is a green tire holding device having a plurality of horizontal arms (e.g., eight) each on which a number of green tires (e.g., three) are hung. The horizontal arms can have a crosssectional shape compatible with this hanging. For example, the arm can have a half-moon shape to form a sling for the green tires.

In its vertical hanging position, a green tire has a tendency to sag or droop under its own weight, due to gravitational forces on the unsupported portions of the green tire, and become distorted. Specifically, because only an upper portion of the green tire rests on the horizontal arm, this portion is constantly subjected to the gravitational pull of the lower portions of the green tire.

SUMMARY OF THE INVENTION

The present invention provides a green tire storage device that counters the constant gravitational forces for a green tire during the pre-curing wait cycle for that tire.

More particularly, the present invention provides a green tire holding device comprising a frame, a rod extending horizontally from the frame, and a bladder mounted on the rod. The bladder is inflatable from a deflated shape to an inflated shape so that it can contact a substantial portion of an inner circumference of the green tire to support the green tire during a pre-curing wait cycle. Preferably, the inflated size of the bladder can be varied so that the green tire storage device can accommodate green tires of different sizes without any structural modifications.

The green tire holding device can comprise a plurality of rods, a plurality of bladders, and/or a plurality of bladders on each rod. The frame can include an inlet connection valve and a conduit system can connect the inlet connection valve to each of the bladders. The conduit system can be such that a plurality of the bladders are inflated at substantially the same time. Additionally or alternatively, the conduit system can be such that certain bladders can be deflated independently of other bladders. For example, if the green tire holding devices includes a plurality of rods, and each rod includes a plurality of bladders, an outlet valve could be provided for deflating the bladders mounted on one rod independent of the bladders mounted on the other rods.

In a method of making a tire according to the present invention, a green tire is made and then placed on the rod of the holding device with the bladder being in a deflated condition. The bladder is inflated during the pre-curing wait cycle. When the time arrives to cure the green tire, the bladder is deflated, the green tire is removed from the rod, and the tire is cured. The green tire holding device can be transported to another location after the tire is placed thereon. If this transportation is to a doping/curing area, the tire(s) can be removed, doped, and then returned to the rod prior to inflating the bladder(s).

The present invention provides these and other features hereinafter fully described and particularly pointed out in the claims. The following description and drawings set forth in detail certain illustrative embodiments of the invention. These embodiments are indicative, however, of but a few of the various ways in which the principles of the invention can be employed.

DRAWINGS

FIGS. 5A–5H are schematic drawings of a method of using the green tire storage device in a tire manufacturing process according to the present invention.

DETAILED DESCRIPTION

Figure 1:
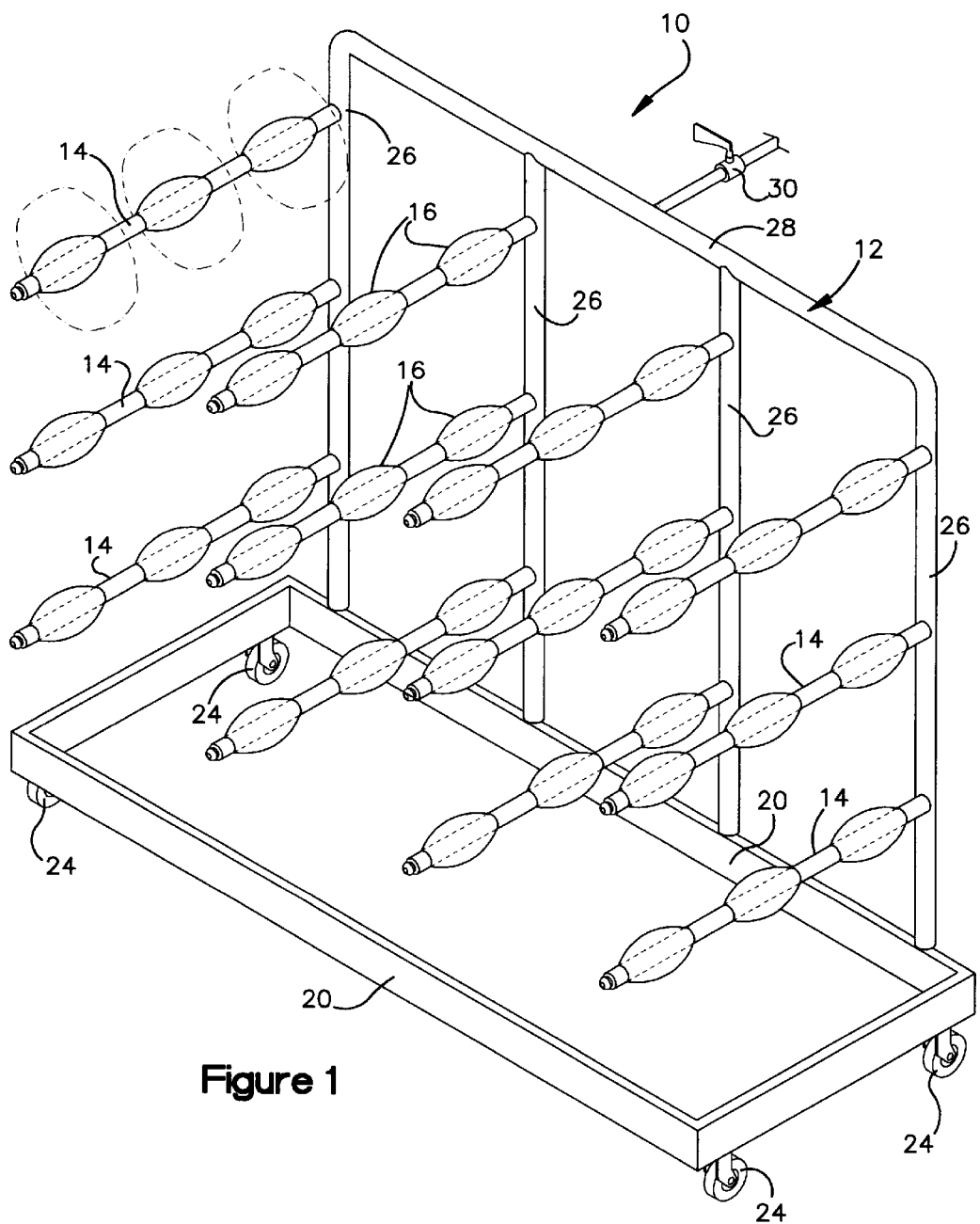
FIG. 1 is a perspective view of a green tire storage device according to the present invention, the device including a series of horizontal arms with inflatable bladders.

Referring now to the drawings, and initially to FIG. 1, a green tire storage device 10 according to the present invention is shown. The storage device 10 includes a frame 12, rods 14 extending horizontally from the frame 12, and bladders 16 on the rods 14. The green tire storage device 10 is used to store green tires while they are waiting to be cured, that is during a pre-curing wait cycle.

Figure 2:
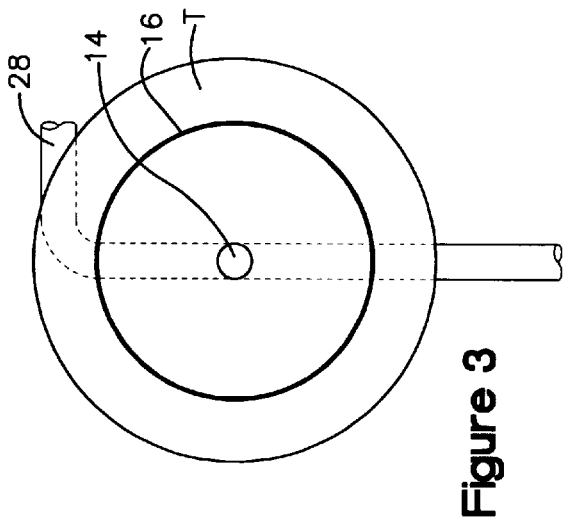
FIG. 2 is a front view of a green tire as initially placed on a rod of the storage device, the bladder being in a deflated condition.
Figure 3:
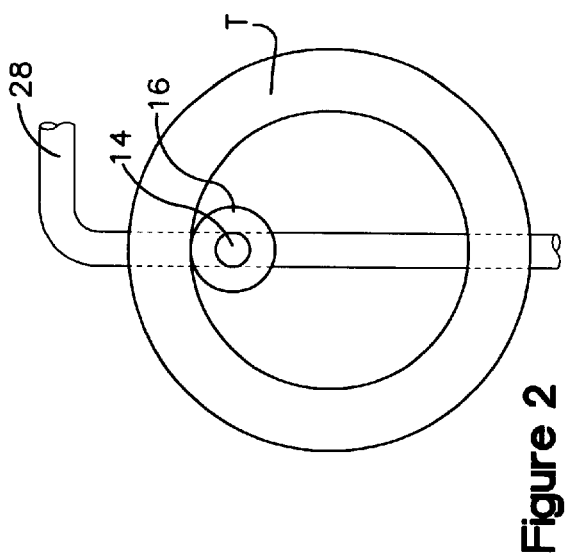
FIG. 3 is a front view of the green tire on the rod once the bladder has been inflated.

Referring now to FIGS. 2 and 3, a green tire T is shown hung on the rod 14 of the green tire storage device 10. In FIG. 2, the bladder 16 is deflated and only an upper portion of the green tire T is supported by the rod/bladder whereby this portion is constantly subjected to the gravitational pull of the lower portions of the green tire T. In FIG. 3, the bladder 16 is inflated so that it expands to the shape of the central opening of the green tire T, thereby substantially supporting the circumferential edge of the green tire defining this opening. This increased support of the green tire T minimizes its tendency to sag or droop under its own weight and become distorted The bladders 16 can be made of a reinforced fabric and have a construction similar to that of an inner tube for a passenger tire. Preferably, the bladders 16 are such that they can be inflated to different pressures and will take on different shapes/sizes. In this manner, the green tire storage device 10 can accommodate different sized tires without structural modifications by simply changing the inflation pressure.

Referring now back to FIG. 1, the illustrated frame 12 includes a bottom support 20 and wheels (or castors) 24 attached to the support's corners for convenient transfer of the storage device 10 from one location to another. Four vertical frame posts 26 extend upwardly from the bottom support 20 and a cross rod 28 extends across the top of the posts 26. A fluid supply inlet connection valve 30 is located on the cross bar 28.

A conduit system connects the inlet connection valve 30 to the bladders 16. For example, the rods 14, the vertical frame posts 26, and the top cross rod 28 could be hollow so that conduit could be installed therein. A top conduit line (not visible in the drawings) could run through the top cross rod 28, four conduit lines (not visible in the drawings) could extend downwardly therefrom through each the vertical frame posts 26, and two horizontal conduit lines 40 (not visible in FIG. 1 but shown in FIG. 4) could extend outwardly from each of the vertical lines through the rods 14. The horizontal conduit line 40 includes passageways 42 into each of the bladders 16.

When the green tire storage device 10 is hooked up to a source of pressurized fluid (e.g., compressed air), the fluid would flow through the inlet connection valve 30, through the top conduit line (in the top cross bar 28), into the four vertical conduit lines (in the vertical posts 26), into each of the eight horizontal conduit lines 40 (in the rods 14), through the passageways 42 and into each of the bladders 16. In this example, the bladders 16 would be inflated at substantially the same time (ignoring flow differentials due to varying distances from the inlet valve 30). Sequential or other inflation patterns could be accomplished, if necessary or desired, by incorporation of a manifold or other type of flow distribution device.

Figure 4:
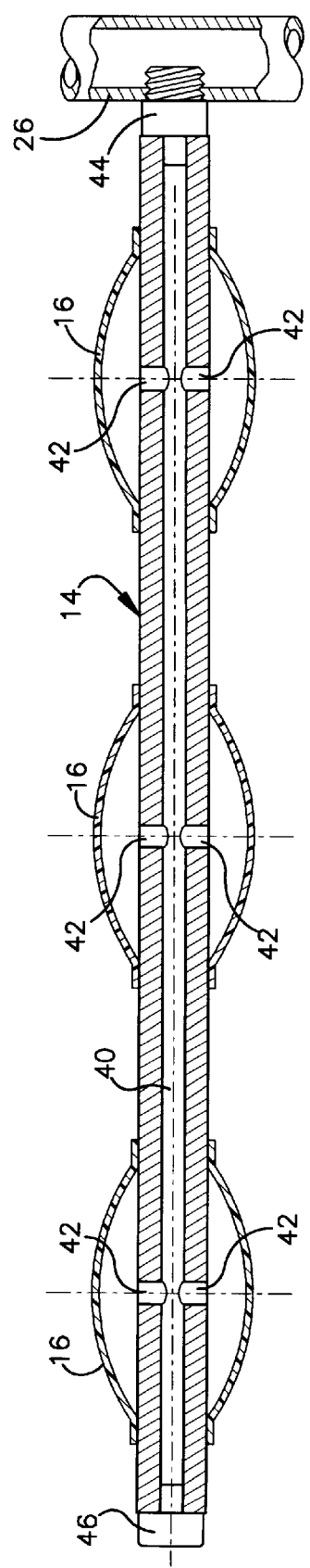
FIG. 4 is a sectional view of one of the rods of the green tire storage device.

As shown in FIG. 4, the conduit line 40 in the rod 14 can have a check valve 44 at its proximate end to ensure that the pressurized fluid does not escape therefrom back into the vertical conduit line in the corresponding vertical post 24. The conduit line 40 can also have a valve 46 at its distal end, which can be activated outside the rod 14, for releasing fluid from the conduit line 40 to deflate the bladders 16. In this manner, the bladders 16 on each rod 14 can be deflated independently of the bladders on other rods thereby allowing each set of three tires T to remain on the inflated bladders until just prior to curing.

In a method of making a tire according to the present invention, a green tire T is made and placed on the green tire storage device 10 while the bladders 16 are deflated. (FIG. 5A.) The device 10, with the tire T placed thereon, is then transported to a doping/curing area. (FIG. 5B.) The tires T are removed from the rods 14 (with the bladders 16 still deflated) and the doping process is performed. (FIG. 5C.) The doped tires T are returned to the rods (with the bladders 16 still deflated). (FIG. 5D.) A pressurized air supply is then connected to the inlet 30 (FIG. 5E) and the bladders 16 are inflated (FIG. 5F). The bladders 16 are left in the inflated condition during the pre-curing wait cycle. When curing time arrives, the bladders 16 on one rod 14 are deflated. (FIG. 5G). The tires T are then removed from this particular rod 14 for curing. (FIG. 5H). This deflation/removal process is repeated for each rod 14 at the appropriate time.

Rod-by-rod deflation of the bladders 16 is believed to be sufficient for most tire making methods. However, a green tire storage device allowing individual bladders to be deflated independently of each other might be more acceptable in some tire making methods. Also, a green tire storage device allowing substantially simultaneous deflation of all of the bladders can be adequate in other tire making methods. These alternate deflation patterns are certainly possible with and contemplated by the present invention.

Although the invention has been shown and described with respect to a certain embodiment, it is obvious that equivalent alterations and modifications will occur to others skilled in the art upon the reading and understanding of this specification. The present invention includes all such alterations and modifications and moreover is limited only by the scope of the following claims.

What is claimed is:

1. A method of making a tire, comprising the steps of:
   making a green tire;
   hanging the green tire on the rod with an inflatable bladder mounted thereon, the bladder being in a deflated condition;
   inflating the bladder to an inflated shape so that it can contact a substantial portion of an inner circumferential edge of the green tire to support the green tire;
   storing the tire on the inflated bladder during a pre-curing waiting cycle;
   deflating the bladder;
   removing the tire from the rod; and
   curing the tire.

2. A method as set forth in claim 1, further comprising the steps of removing the green tire from the rod, doping the green tire, and then returning the doped green tire to the rod, wherein these steps are performed prior to the inflating step.

3. A method as set forth in claim 1, wherein said inflating step comprises inflating the bladders to a certain inflation pressure corresponding to the size of the green tire.

4. A green tire holding device comprising a frame, a plurality of rods extending horizontally from the frame, and a plurality of bladders mounted on each rod, each bladder being inflatable from a deflated shape to an inflated shape so that it can contact a substantial portion of an inner circumferential edge of a green tire to support the green tire during a pre-curing wait cycle.

5. A green tire holding device as set forth in claim 1, wherein the frame includes an inlet connection valve and wherein a conduit system connects the inlet connection valve to the bladders.

6. A green tire holding device as set forth in claim 5, wherein the conduit system includes conduit lines which inflate a plurality of the bladders at substantially the same time.

7. A green tire holding device as set forth in claim 6, wherein the conduit system includes outlet valves for deflating certain bladders independently of other bladders.

8. A green tire holding device as set forth in claim 1, comprising an outlet valve for deflating the bladders mounted on this rod independent of bladders mounted on other rods.

9. A green tire holding device as set form in claim 1, wherein an inflated size of the bladder can be varied to accommodate green tires of different sizes.

10. A method of making a tire, comprising the steps of:
    making a green tire;
    placing the green tire on one of the rods of the green tire holding device of claim 1 with the bladders on this rod in a deflated condition;
    inflating the bladders to an inflated shape;

storing the tire on the inflated bladders during the pre-curing wait cycle;

deflating the bladder;

removing the tire from the rod; and curing the tire.

11. A method as set forth in claim 10, further comprising the step of transporting the green tire holding device to another location after said placing step.

12. A method as set forth in claim 11, wherein the other location is a doping/curing area and wherein said transporting step is performed prior to said inflating step.

13. A method as set forth in claim 10, further comprising the steps of removing the green tire from the rod, doping the green tire, and then returning the doped green tire to the rod, wherein these steps are performed prior to the inflating step.

14. A method as set forth in claim 10, wherein the green tire storage device comprises a plurality of bladders and wherein said inflating step comprises inflating all of the bladders at substantially the same time.

15. A method as set forth in claim 10, wherein said deflating step comprises deflating the bladders on one rod independent of the bladders on the other rods.

16. A method as set forth in claim 10, wherein said inflating step comprises inflating the bladders to a certain inflation pressure corresponding to the size of the green tire.

* * * * *